Figure 1:
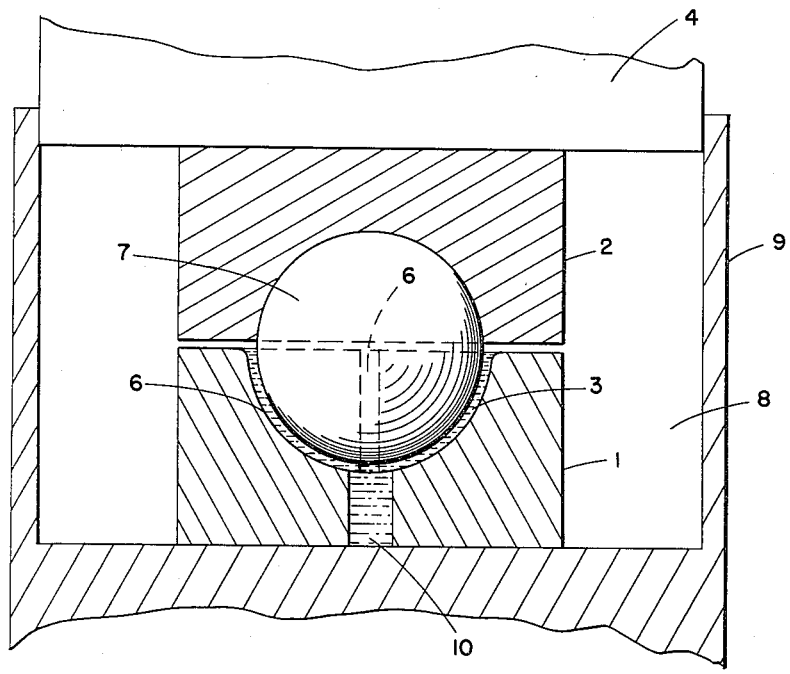

June 26, 1956  J. S. ACTERMAN ET AL  2,752,209
INSTRUMENT BEARING
Filed Sept. 15, 1952

INVENTORS
JOSEPH S. ACTERMAN
DARWIN L. FREEBAIRN, JR.
BY  BERT J. SHERWOOD

*William R. Lane*

ATTORNEY

United States Patent Office 2,752,209
Patented June 26, 1956

2,752,209

INSTRUMENT BEARING

Joseph S. Acterman and Darwin L. Freebairn, Jr., Long Beach, and Bert J. Sherwood, Lakewood, Calif., assignors to North American Aviation, Inc.

Application September 15, 1952, Serial No. 309,711

3 Claims. (Cl. 308—172)

This invention relates to a spin bearing, and in particular to a spin bearing which is adapted for use in precision instruments.

Provision of a satisfactory bearing for the rotors of precision instruments, and in particular for the rotors of precision gyroscopes is a very serious problem. The principal requirements for rotor bearings in precision gyroscopes are constancy of elastic properties, freedom from vibration, long life, and self servicing. In addition, simplicity and low cost are important requirements.

Bearing vibration in a precision gyroscope sets a limit upon the degree to which dynamic balance is obtained and gives rise to disturbing torques. In addition, vibration components obscure the precession of the gyroscope. Vibration also results in wear.

Constancy of elastic properties implies either extreme rigidity (negligible deflection under load) or a deflection which is accurately reproducible. The importance of controlling rotor displacements is illustrated by reference to a gyroscope having a rotor weighing 2000 grams which operates with an angular momentum of $10^8$ gram centimeter squared per second. When the input or torque axis of the gyroscope is placed in a vertical position, a lateral shift of the rotor of $10^{-6}$ centimeter results in a moment of 2 dine-centimeter under normal gravity acceleration and produces a drift rate of $2 \times 10^{-8}$ radians per second (0.004 degree per hour).

The constancy of the elastic properties of ball bearings and their freedom from vibration have heretofore caused them to be selected, as the best that were available in the art of instrument making, for use as a gyroscope rotor support. However, the behavior of ball bearings when applied to high precision gyroscopes, even when the utmost skill is applied to their fabrication and installation is far inferior to the operation of the device of this invention. Although ball bearings are very good, their principal defects are still: (1) Vibration, which is of substantial amplitude over a wide frequency range, including not only the spin frequency but multiples thereof corresponding to the number of balls and to beat frequencies between two bearings on the shaft; (2) insufficient rigidity, and what is more serious, mechanical hysteresis, as might be expected from the complex multi-part nature of the bearing; (3) difficult and critical installation problems, due to necessity for very close mount dimension and alignment tolerances and for absolute cleanliness; (4) high cost, both of the bearing itself and of the installation.

The device of this invention is an improvement over ball bearings in respect to each of the defects mentioned above. The bearing of this invention is a so-called boundary-lubrication type, in which the ball rotor and socket stator members are separated by an exceedingly thin film of a substance which adheres tenaciously to the bearing surfaces, while being readily sheared in the film itself. Such a bearing possesses a much greater rigidity than either ball or fluid bearings of the same load-carrying capacity. In addition it has many of the advantages of a fluid bearing (smoothness, simplicity, cheapness) while it retains the principal advantage of ball bearings in that it does not require a continuous supply of lubricant.

For years, the first and most obvious method of reducing shear stress in a bearing has been to reduce the surface roughness of the bearing which decreases the number of hills and valleys that interlock and then have to be sheared. The device of this invention uses the more subtle and successful approach of augmenting an improved surface finish with a surface that shears easily. A surface that shears easily can be autogenous—for example, the quasi-molten bismuth layer that forms on metallic bismuth when it is rubbed—or it can be an extraneous material such as that used in the bearing of this invention.

Ideally, a bearing with no liquid lubricant is very desirable where extreme rigidity is required. Indium plating is a dry-friction type lubricant which provides a very rigid bearing. A bearing without a liquid lubricant, however, is not satisfactory. The high angular velocities do not permit utilization of dry friction because it generates heat and because it is characterized by the stick-slip phenomenom which causes chattering and vibration. Some low-friction materials such as nylon are such poor heat conductors that the frictional heat which is generated is sufficient to melt completely the bearings at the frictional interface and destroy the bearing geometry.

Indium plating, exhibiting an additional low friction coefficient, flows and shears easily but it allows the easily sheared surface to flow away from the friction interface and cause eventual deterioration of the bearing. At the other extreme, even though a diamond displays a low initial friction characteristic, it is not satisfactory due to the fact that the diamond does not shear but only ploughs the metal surface against which it runs.

The ideal boundary lubricant is one which reacts with the frictional interfaces to form an easily sheared surface, is able to renew the sheared surface when a particle is torn away, is active chemically toward the friction faces, and does not combine chemically with the ambient atmosphere to form a gun or sludge. Lubricants used in the bearing of this invention fulfill these requirements with the exception of the requirement that the lubricant should not combine chemically with the atmosphere.

It is therefore an object of this invention to provide a spin bearing whose elastic properties are extremely constant.

It is another object of this invention to provide a spin bearing which is extremely free from vibration.

It is another object of this invention to provide an instrument spin bearing whose elastic properties are more constant than instrument spin bearings heretofore known.

It is another object of this invention to provide an instrument spin bearing whose vibration is substantially less than any non-hydrodynamic spin bearing heretofore known.

It is another object of this invention to provide a spin bearing that has long life.

It is another object of this invention to provide a spin bearing which is self servicing.

Figure 2:
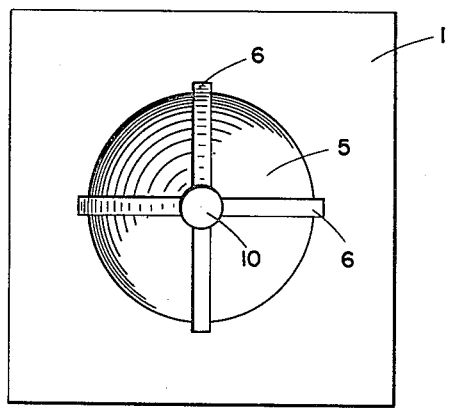

Other objects of invention will become apparent from the following description taken in connection with the accompanying drawing, in which Fig. 1 is a side section view of a preferred embodiment of this invention; and Fig. 2 is a top view of the socket of a preferred embodiment of this invention.

In Figs. 1 and 2, stator 1 supports rotor 2 upon thin lubricant film 3. Rotor 2 is held in contact with lubricant 3 by the weight or preloading of load 4. Stator 1 has a cup 5 shown more particularly in Fig. 2, which is spherically shaped and which has grooves 6 extending from the axis of symmetry or nadir outwardly in the surface of cup 5 along segments of great circles of the spherical shape of cup 5. Lubrication sump 10 is optional. Rotor 2 has an appendage 7 which is of a spherical shape and has the same radius of curvature as cup 5. Appendage 7 is hemispherical and is preferably fabricated by attaching a ball into a socket in the main body of rotor 2. Appendage 7 has an axis of symmetry which coincides with the axis of symmetry of load 4 and is positioned to coincide with the axis of symmetry of cup 5. Appendage 7 fits precisely into cup 5 and is only separated therefrom by a thin film of lubrication of the order of a few molecules of lubricant. Stator 1 and rotor 2 are fabricated of metal, the surfaces of which are preferably iron and electroless nickel or other nickel alloy which can be hardened to the vicinity of Rc40. Lubricant 3 is a fatty acid. The entire bearing operates in an atmosphere 8 which is separated from outside air by partition 9 and which does not combine chemically with the lubricant, for example, nitrogen, hydrogen, or helium.

In operation, rotor 2 spins on stator 1 and is separated from stator 1 only by lubricant 3. Grooves 6 act as a lubricant reservoir and to catch or scavenge any particles that are worn from the bearing surface.

The device of this invention utilizes an optimum combination of geometry, composition of bearing surface, and composition of lubricant for high speed light load instrument spin bearings. It uses a fatty acid between the metal bearing surfaces which are preferably of iron and electroless nickel.

A greatly magnified cross section of a bearing of this invention shows a strongly oriented chemical structure at each bearing surface where the fatty acid molecules tightly adhere to the metal (believed to be in actual chemical union wherein the carboxyl radicals combine with the metals to form soaps) and form an easily-sheared laminated layer in the extremely narrow gap between the rotor and stator. Forces of adhesion between the lubricant and the metal are so high that an adequate supply of lubricant is retained in the bearing gap for several thousand hours.

The bearing is preferably made in the form of spherical members opposed to hemispherical cups, as this form is easy to manufacture with very small clearances and is also perfectly self-aligning—an important consideration in a bearing which inherently needs no clearance to take care of misalignment. In a typical example of this invention the ball, 0.25 inch +10 microinches in diameter and +10 microinches sphericity, is of steel (SAE 52100) and the cup is of steel and has a thin plating of nickel, formed by the so-called electroless method. (Patent No. 2,532,283, issued December 5, 1950, to Abner Brenner and Grace E. Riddell, for "Nickel Plating by Chemical Reduction.") The lubricant is U. S. P. grade oleic acid, $$CH_3 \cdot [CH_2]_7 \cdot CH:CH \cdot [CH_2]_7 \cdot COOH$$

Since oleic acid is an unsaturated hydrocarbon which has one double bond between carbon atoms and is subject to oxidation in air, the bearing is operated in an atmosphere which is chemically inert to the lubricant-nitrogen or if minimum windage loss is required, hydrogen or helium.

In the example cited the deflection of a typical bearing as measured by a gauge is about 0.5 to 1 microinch per pound of load. The bearing is maintained ten times as rigid as a ball bearing of equivalent load carrying capacity. The high rigidity is attributed to an exceedingly small working gap into a close conformity of the rotor and stator curvatures.

It can easily be shown from the theory of lubrication that the coefficient of friction is equal to the radio between the interface shear stress and the flow stress of the material. Frictional forces can be reduced by either reducing the interface shear stress or increasing the flow stress of the bearing material. Flow stress can be increased by using a very hard material such as a diamond. This approach has the distinct limitation that materials which have higher flow stresses have simultaneously higher shear stresses, with the result that the use of very hard materials produces diminishing returns. The device of this invention reduces the interface shear stress and both improves the surface finishing of the bearing and augments the improved surface finish with a lubricated surface that shears easily.

When boundary lubrication such as that used in this invention is used the anti-adhesive properties of the lubricant, not the viscosity of the lubricant, is the determining factor in reducing friction and wear. It is common practice to use petroleum oils as a lubricant. Petroleum oils are, however, relatively poor in their anti-adhesive action, although it is possible to improve the anti-adhesive properties of petroleum oils by adding chlorine or sulphur compounds to the oils because the chlorine or sulphur reacts with the metal and forms, for example, iron sulfide or iron chloride which are easily sheared compounds.

The ideal boundary lubricant is one which reacts with frictional interface to form an easily sheared surface, is able to renew the sheared surface should a particle be torn away, is active chemically toward the friction faces, and does not form a gum or sludge or chemically react with the atmosphere.

Substances which fulfill these requirements (with the exception of inertness toward the atmosphere) are found in the class of organic compounds known as the fatty acids. These compounds are characterized by the chemical structure $$CH_3(CH_2)_n COOH$$

Compounds of this class when used as lubricants react with the metal surfaces to form a soap at the friction interface.

For example, stearic acid reacts with steel to form $$[CH_3(CH_2)_{16}COO]_2Fe$$

ferrous stearate.

These soaps are greasy in nature and shear easily.

As stated, the preferred spin bearing of this invention uses oleic acid as a lubricant. It is believed that the oleic acid reacts with both the electroless nickel and steel so that there are in effect two different type soaps rubbing across each other. Oleic acid like stearic acid has 18 carbon atoms although oleic acid is an unsaturated compound (see formula above). This gives rise to the danger that the double bond may combine with oxygen and result in the formation of a gum or sludge. The formation of a gum or sludge is prevented by operating the bearing in an atmosphere to which oleic acid is chemically inactive, for example, hydrogen, helium, or nitrogen.

The choice of a steel ball, electroless nickel plated cup, and oleic acid lubricant results in a bearing whose life exceeds by far any of the many other possible combinations. Other materials produce satisfactory bearing performance only for periods of five to thirty hours. With the combination of this invention the bearings are operated satisfactorily after 3000 hours of operation and consistently operate for over 1000 hours.

The geometry of this invention is chosen because of its simplicity, its ability to provide simultaneous radial and axial restraint, its low runout limited by the sphericity of the single ball and mating cup which constitutes the bearing (within, for example, 10 microinches for a new ball and less after the running-in period) and its relative insensitivity to shock load brinelling because mating moving parts have exact contour matches.

It is therefore shown that the bearing of this invention satisfies the requirements of rigidity as compared to thick film fluid bearings, and freedom from vibration as compared to ball bearings. The device of this invention meets an urgent need of the art of instrument making, in general, and the precision gyroscope art, in particular.

The superior lubrication properties of the combination of iron, oleic acid, and electroless nickel are not confined to ball and socket geometry but can also be applied to other bearing geometry, such as a journal bearing.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A boundary-lubrication type spin bearing comprising a hemispherical socket having a metal faced surface and having grooves extending from the nadir of the socket along arcs of great circles of said hemisphere, a hemispherical metal surfaced ball mating precisely with said socket, said grooves extending continuously along the entire bearing surface between said ball and said socket, a fixed thin molecular layer of a lubricant consisting essentially of fatty acid between said ball and socket and in said groove, an inert atmosphere surrounding said lubricant, and means to confine said inert atmosphere around said lubricant.

2. A device as recited in claim 1 in which one of said metal surfaces is iron, the other said metal surface is electroless nickel, and said fatty acid is oleic acid.

3. A device as recited in claim 1 in which said fatty acid is stearic acid.

References Cited in the file of this patent

UNITED STATES PATENTS

| | | |
|---|---|---|
| 463,538 | McCully | Nov. 27, 1891 |
| 953,231 | Rice | Mar. 29, 1910 |
| 1,059,313 | Perkins | Apr. 15, 1913 |
| 1,319,129 | Southcombe | Oct. 21, 1919 |
| 2,003,163 | Warren | May 28, 1935 |
| 2,179,824 | Kip | Nov. 14, 1939 |

FOREIGN PATENTS

| | | |
|---|---|---|
| 588,546 | Great Britain | May 27, 1947 |